United States Patent
Powell et al.

(10) Patent No.: US 6,941,878 B2
(45) Date of Patent: Sep. 13, 2005

(54) ADVANCED VITRIFICATION SYSTEM 2

(75) Inventors: James R Powell, Shoreham, NY (US); Morris Reich, Kew Gardens Hills, NY (US)

(73) Assignee: Radioactive Isolation Consortium, LLC, Falls Church, VA (US)

(*) Notice: Subject to any disclaimer, the term of this patent is extended or adjusted under 35 U.S.C. 154(b) by 145 days.

(21) Appl. No.: 10/605,384

(22) Filed: Sep. 26, 2003

(65) Prior Publication Data

US 2004/0106839 A1 Jun. 3, 2004

Related U.S. Application Data

(60) Provisional application No. 60/413,878, filed on Sep. 27, 2002.

(51) Int. Cl.[7] .................... F23B 7/00; F23J 1/02
(52) U.S. Cl. ............. 110/250; 110/241; 110/341; 110/169; 110/167; 588/252
(58) Field of Search ................ 137/909, 828; 588/259, 249, 11, 252, 228; 110/341, 346, 167, 169, 241, 250, 165 R, 166

(56) References Cited

U.S. PATENT DOCUMENTS

| | | | | |
|---|---|---|---|---|
| 4,306,506 A | * | 12/1981 | Rotter | 110/229 |
| 5,611,766 A | * | 3/1997 | Carle et al. | 588/252 |
| 5,678,237 A | * | 10/1997 | Powell et al. | 588/11 |
| 6,485,404 B1 | * | 11/2002 | Powell et al. | 588/252 |

* cited by examiner

Primary Examiner—Kenneth Rinehart
(74) Attorney, Agent, or Firm—Louis Ventre, Jr.

(57) ABSTRACT

A melter for the vitrification of waste, and method of using the melter, in the form of a disposal canister, wherein the melter is capable of filling multiple disposal canisters of waste and subsequently of being filled with vitrified waste and disposed of in like manner to that of a disposal canister. In the method of the invention, while waste is loaded into the melter, it is melted and then allowed to flow out of the melter and into a disposal container. The filled disposal container is then removed and and replaced with an empty disposal container. This is repeated until a fixed number of disposal containers are filled. Then, the melter is filled with vitrified waste and disposed of in the same manner as for a disposal canister.

3 Claims, 4 Drawing Sheets

ADVANCED VITRIFICATION SYSTEM 2

CROSS REFERENCE TO RELATED APPLICATIONS

This application claims the benefit of U.S. Provisional Application No. 60/413,878 filed on 27 Sep. 2002.

BACKGROUND OF INVENTION

The Advanced Vitrification System is a "melt-in-the-final-disposal-container," waste vitrification technology and method of in-situ vitrification of waste materials in a disposable canister. It is disclosed in U.S. Pat. No. 5,678,237, which is incorporated herein by reference. For purposes of this disclosure, the technology and method described in U.S. Pat. No. 5,678,237 is part of the technology and method referred to as AVS-1. For purposes of this disclosure, the AVS-1 also comprises the single walled crucible of U.S. Pat. No. 6,485,404. Also for purposes of this invention, the term "waste" includes the waste all the material requiring disposal and all additives with which such material is mixed to promote vitrification.

The disclosure of U.S. Pat. No. 6,558,308 issued 06 May 2003, which describes a heating methodology for the AVS-1, is incorporated herein by reference. The disclosure of U.S. Pat. No. 6,485,404 issued 26 Nov. 2002, which describes a single-walled crucible for the AVS-1, is incorporated herein by reference.

This invention is a modification of AVS-1 technology and method of vitrification and is referred to herein as the Advanced Vitrification System 2, or AVS-2. In the AVS-2, the final disposal container is made into "AVS-2 Melter Module," which undergoes "multiple use" before it is filled and sealed for disposal. Essentially, to enable multiple use, a drain is added to the bottom of an AVS-1 module to enable molten waste to be drained into a standard canister. In contrast, the AVS-1 module had no bottom drain and the AVS-1 method anticipated a "single-use" or "single-cycle" for the vitrification process in the final disposal container.

Objects of the AVS-2 invention are: (1) to lower overall cost to permit competitive vitrification of a larger range of wastes, for example, high-level radioactive waste, low-level radioactive waste and hazardous waste. (2) to increase production rate of canisters of vitrified waste from a given size facility. (3) to increase the canister fill factor because of the canisters filled from the bottom drain need not have the AVS-1 module internals needed to melt the waste. Such a filled canister can be filled up to about 95% of the canister height. (4) to ease and simplify the disconnect/connect operations for feed and off-gas piping. Such operations need only be done for the AVS-2 when the AVS-2 Melter Module has concluded its operational lifetime. (5) to increase the cooling rate of the vitrified product, which improves its leach resistance. (6) to ease melter decontamination, decommissioning, and disposal, since the melter is the AVS-2 Melter Module and it can be disposed of in the same manner as a disposal canister. (7) to ease control of the in-can vitrification process, since the AVS-2 Melter Module can be run continuously at steady rate.

The Advanced Vitrification System (AVS-1)vitrifies waste directly inside the final disposal canister. In the art, the term "canister" and "container" are used interchangeably. Thus, the melter is also the disposal container or canister. When the waste is highly radioactive, toxic or hazardous, disposal of the waste and the melter together greatly simplifies the process from the current generation melter technology.

The primary method of heating the wastes in the disposal container is by energizing a surrounding induction coil, which heats the waste directly and indirectly through heated walls of the surrounding container. However, the means for heating may be other traditional means well known in the art: for example, by direct or indirect electric resistance or by adding radio frequency energy.

Direct vitrification in the final disposal canister made the AVS-1 completely different from the current generation melter technology used in the United States Department of Energy's (DOE) baseline melter program. In DOE's baseline melter program, radioactive waste is continuously fed into a large pot melter, generically known as a "pot melter," or a "Joule-heated melter." An electric current passes through the waste between two electrodes within the pot melter, melting the waste. The molten waste is then poured into a disposal canister.

The DOE's baseline program assumes that the pot melter will be re-used for several years and then disassembled and disposed of in accordance with the rules, a process generally known as decontamination and decommissioning (D&D). Two large uncertainties are: (1) how to D&D a joule melter, considering that the pot melter will be highly contaminated with high-level radioactive wastes: Development of the D&D process is left to the future; and (2) how to ensure pot melter lifetime with the unique prospect of widely varying waste chemistry.

An important benefit of the AVS-2 is that there is no contaminated melter equipment requiring special handling for decontamination, decommissioning and disposal. Overall, contamination concerns are significantly reduced because the entire melter system is isolated —no emissions into the cell —and the disconnects of the feed and off-gas pipes from the AVS-2 Melter Module are at minimum intervals of a month or two.

Thus, each AVS-2 Melter Module is re-used multiple times as a melter and then filled with vitrified waste, sealed-off and disposed of, greatly simplifying melter disposal.

SUMMARY OF INVENTION

A device for the vitrification of waste and method of using the device. The device is a melter in the form of a disposal canister, wherein the melter is capable of filling multiple disposal canisters of waste and subsequently of being filled with vitrified waste and disposed of in like manner to that of a disposal canister. In the method of the invention, while waste is loaded into the melter it is melted and then allowed to flow out of the melter and into a disposal container. The filled disposal container is then removed and and replaced with an empty disposal container. This is repeated until a fixed number of disposal containers are filled. Then, the melter is filled with vitrified waste, cooled, sealed and then disposed of in the same manner as a disposal canister. The process is completed by insertion of a new melter.

DETAILED DESCRIPTION

The AVS-2 device is an AVS-1 module with a means to drain the molten waste material into a receptacle. Herein it is termed the "AVS-2 Melter Module." The AVS-2 process melts waste in a modified AVS-1 module and drains it to a receptacle, also known as a disposal canister or disposal container.

The features of the AVS-2 Melter Module are a detachable means for adding waste, a detachable means for removing off-gases, a means for adding heat to melt the waste, a detachable means for regulating the flow of melted waste out of the AVS-2 Melter Module, a means for disposing of said filled module, wherein the module has the same outward appearance as a disposal container.

Figure 1:
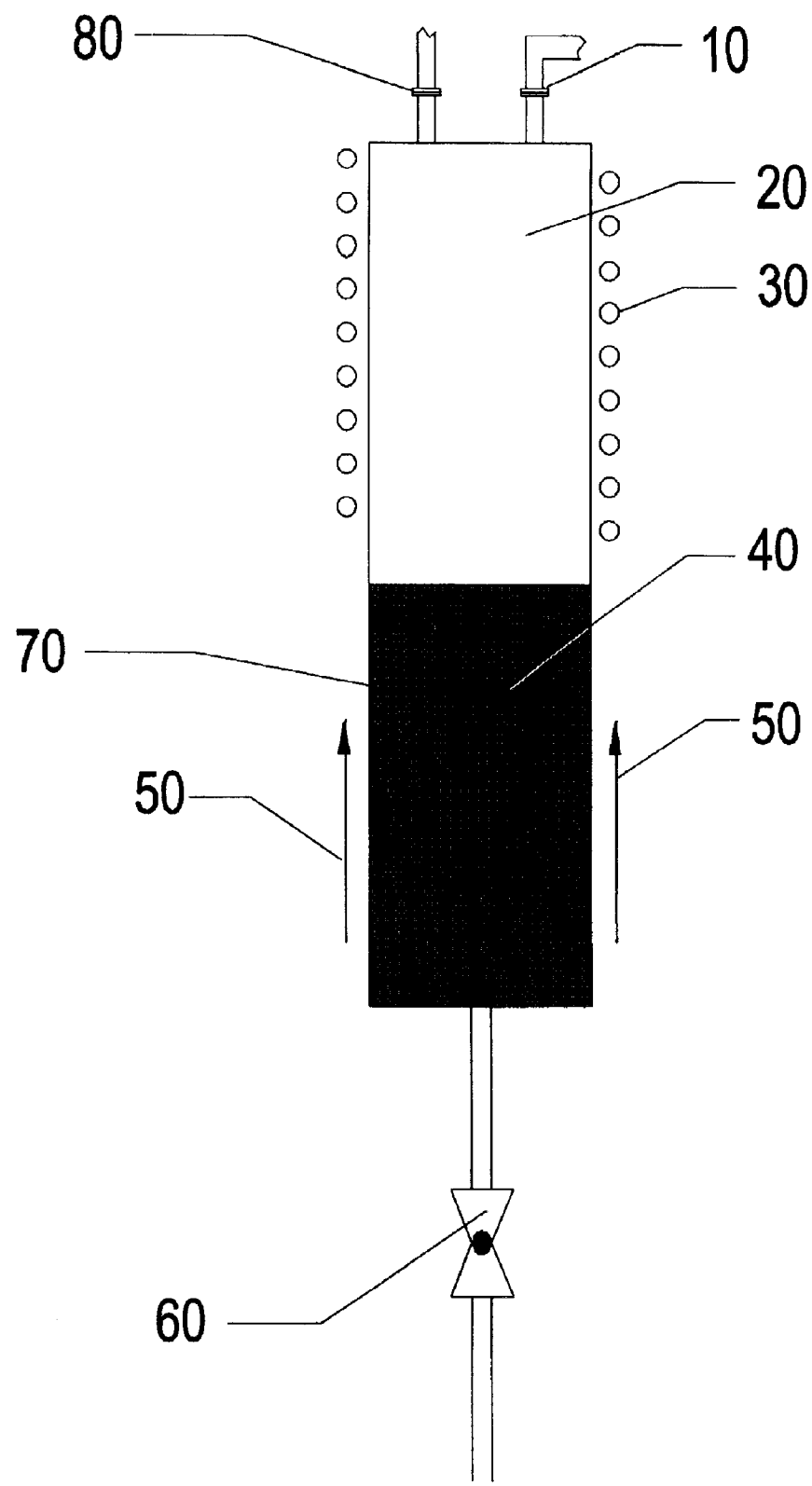
FIG. 1 is a cross sectional view of the AVS-2 Melter Module.

FIG. 1 shows an embodiment of the AVS-2 Melter Module (70). Similar to the AVS-1 module, the AVS-2 Melter Module has a detachable means for adding waste (80) and removing off gases (10), inductive heating coils (30) as a means for adding heat, a coolant flow along the exterior (50) to regulate heating and cooling, a radiant heating or hohlraum area (20) above a molten pool of waste (40) to support the melting and vitrification process, and a detachable means (60) for regulating the flow of melted waste out of the module.

The first feature is a detachable means for adding waste to the AVS-2 Melter Module. The waste (in solid or liquid slurry form) is mixed with any needed glass making material; such mixture is herein called "waste." The waste is then introduced through a detachable feed pipe (80) into the top head of an AVS-2 Melter Module, as it is for the AVS-1 module. As with the AVS-1 module, the detachability function may be supplied as an integrated top head unit, which itself is detachable from the AVS-2 Melter Module.

The second feature is a detachable means for removing off-gases. As is well known in the art, when the waste heats and melts it often releases gases, which must be removed from the melter, treated and disposed of in an appropriate manner. The detachable means for removing off-gases is a detachable vent pipe that leads to filters, traps and collection points. As with the AVS-1 module, the detachability function may be supplied as an integrated top head unit, which itself is detachable from the AVS-2 Melter Module.

The third feature is a means for adding heat to melt the waste. As in the AVS-1 module, the primary method of heating the wastes in the disposal container is by energizing a surrounding induction coil. Most of the energy from the coil is deposited in and heats heats the walls of the AVS-2 Melter Module. The walls then heat the waste. As in the AVS-1, selective heating of segments of the walls can maximize the homogeneity of the vitrified waste. The means for heating may be other traditional means well known in the art: for example, by direct or indirect electric resistance or by adding radio frequency energy.

The fourth feature is a detachable means for regulating the flow of melted waste out of the AVS-2 Melter Module. This feature adds functionality not found in the AVS-1. This means for regulating includes functionality to start, stop and change the rate of, the flow of melted waste out of the AVS-2 Melter Module. This detachable means for regulating the flow of melted waste must, when the processing life of the AVS-2 Melter Module time is ended, allow the AVS-2 Melter Module to fill with vitrified waste in such a manner as to permit the combined ultimate disposal of the vitrified waste and the AVS-2 Melter Module. The term "detachable" is intended to encompass the process of disconnecting from external devices such that the integrity of the AVS-2 Melter Module can be maintained, restored or accomplished in accordance with disposal requirements.

In the preferred embodiment, the detachable means for regulating the flow of melted waste is a drain valve (60), shown in FIG. 1. The drain valve may be a traditional valve well known in the art, or, preferably, is a freeze-drain shut-off valve as shown as an elevation section in FIG. 2. FIG. 3 shows top views of alternative embodiments of said valve having one discharge hole (32) and three discharge holes.

Figure 2:
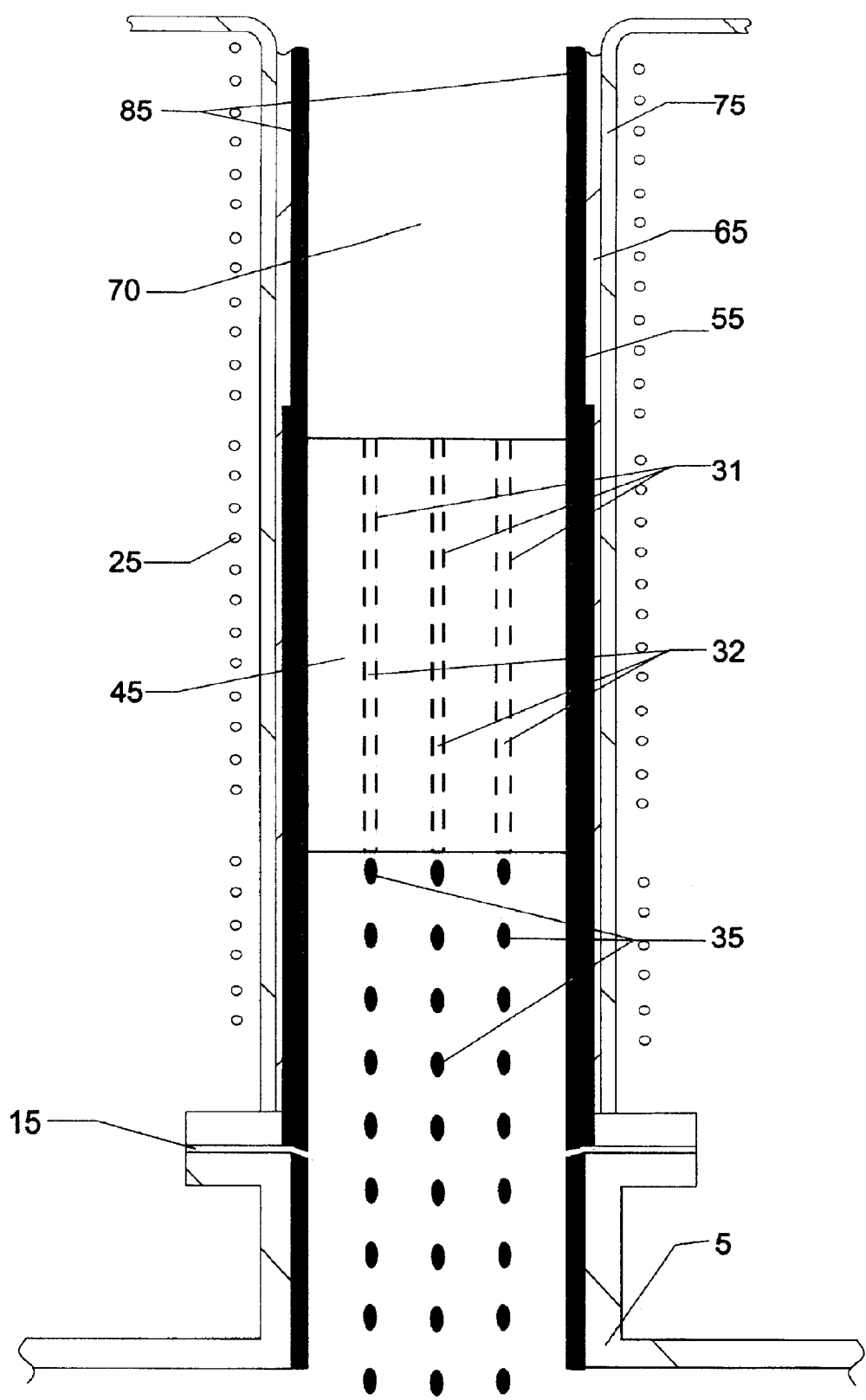
FIG. 2 is a cross sectional view of a means for regulating the flow of melted waste out of the AVS-2 Melter Module.
Figure 3:
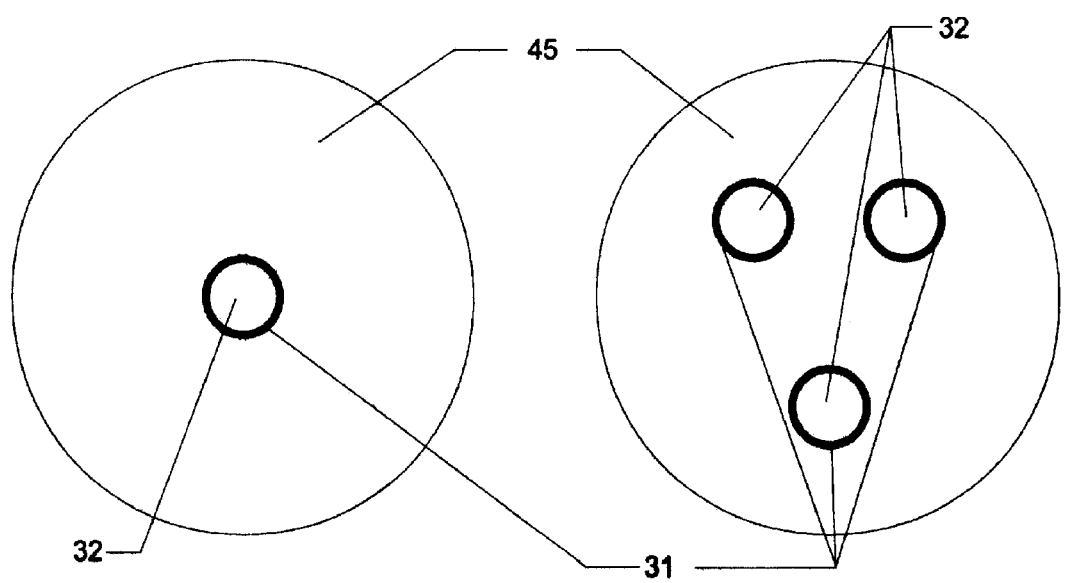
FIG. 3 is a top view of means for regulating the flow of melted waste out of the AVS-2 Melter Module.
Figure 4:
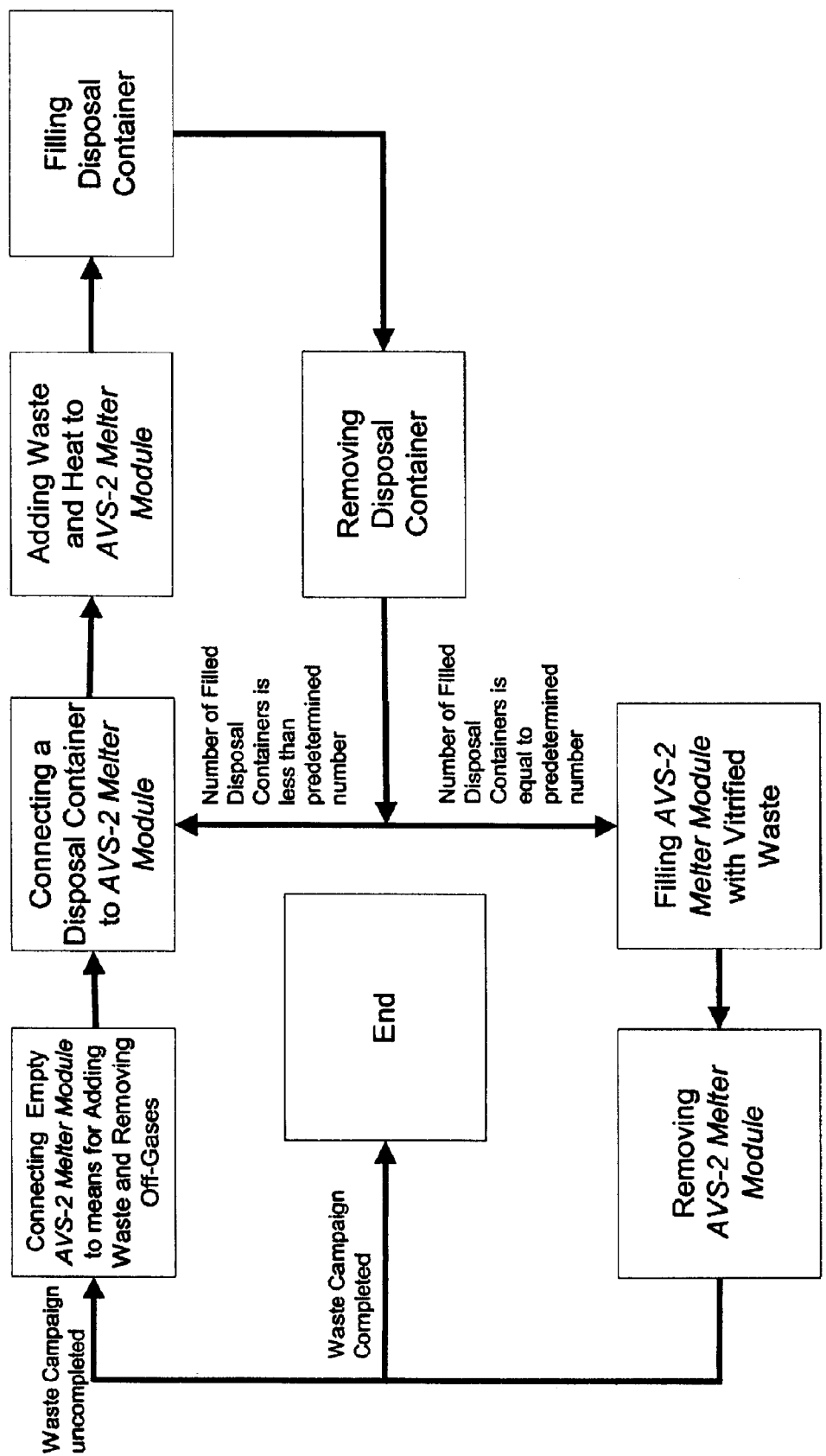
FIG. 4 is a diagram of the process of using the AVS-2 Melter Module.

Referring to FIG. 2, the valve has an outer stainless steel body (75), a lining of insulation (65), a lining of graphite (55), a lining or coating on the graphite, typically alumina (85), and a graphite block (45) in the middle segment of the valve coated with corrosion protection, typically alumina and having one or more corrosion protected holes or flow channels (32) that permit discharge of molten waste into a disposal container (5).

The valve is operated by regulating the internal temperature of the valve by controlling one or more external inductive heating coils (25). As known in the art, a single coil can be controlled in segments, providing the same control as if three separate coils are used. The preferred embodiment requires three separately controllable coil segments or sections, which are shown in FIG. 2 with some separation between the sections: one around a top section of the valve; one around the middle section of the valve; and one around the bottom section of the valve.

Operating the valve involves controlling the temperature inside the valve. When it is desired to increase melt flow, the internal temperature in the valve is increased; when it is desired to decrease melt flow, the internal temperature is decreased. When a sealed shutoff is desired, inductive heating ceases and the HLW freezes inside the small flow channels (32) in the graphite block of the freeze-drain shutoff valve.

The graphite block (45) is typically be about 10 to 20 centimeters in length and is at a fixed location in the middle section of the valve. In the preferred embodiment, the graphite block extends to the inside diameter of the valve. The valve itself would have a maximum maximum diameter approximating that of the opening at the top of a disposal container receiving the molten waste. For most wastes, a graphite block having a diameter of about 10 to 15 centimeters would be adequate to permit the free flow of molten wastes through the valve and into the disposal container. The graphite block has one or more holes with a diameter of about 2 or more centimeters through which molten waste flows when it reaches an appropriate temperature. Each hole is lined with a material (31), well known in the art, to protect the graphite from corrosion, typically an alumina material.

A flow rate of 18 cubic centimeters per second corresponds to a fill rate of 10 inches per hour in the bottom module. With a viscosity of 1,000 poises, this flow rate is obtained with a hole diameter of 2.8 centimeters. Several holes would be required for very viscous melts, e.g. 10,000 poises, but one hole is probably sufficient for most waste melts. The number of holes and their diameter will, thus, depend on the wastes.

In operating the valve, the upper coil segment maintains the melt at high enough temperature that it can flow freely. The middle coil segment controls the flow rate of the melt through the graphite block. When it is turned off, the waste freezes in the discharge holes, shutting off flow. When the coil is turned on, graphite block heats up and melts the waste. Once melted, the waste flows through the valve at a volume flow rate controlled by the amount of heating. The more heating, the higher the temperature of the graphite block, and the faster the volumetric flow rate. Decisions on the appropriate flow rate are made based upon monitoring the height of the melt surface in the AVS-2 Melter Module by means well known in the art, for example by gamma emissions. If the level starts to rise too much, the heating rate is increased; if the level starts to drop too much, the heating rate is decreased.

The lower heating coil segment in the valve is used to control the temperature of the graphite liner (55) and the alumina liner (85) below the graphite block (45). When the disposal container is being filled, the alumina liner is kept at high temperature to ensure that any glass material from splash or droppings will run down into the disposal container. When the disposal container is ready to be disconnected and removed in order to insert a new module, the lower heating coil is turned off, so that any residual glass remains in place and does not drop out of the valve during the disconnect reconnect process.

The thermal insulation (65) in the region of the upper heating coil segment of the valve is comparable to that used in the AVS-2 Melter Module, in order to keep the melt inside at high temperature. As shown in FIG. 2, the regions of the middle and lower heating coils, however, the thermal insulation is considerably less, so that the interior glass can rapidly freeze when the heating coils are turned off. As a rough estimate, the effective thermal conductivity of the insulation in these regions should be a factor of ~10 higher than that for the AVS-2 Melter Module. This locally increases the cooling load and power requirements, but it is a small effect in terms of the overall cooing and power requirements for the module.

The use of corrosion protected graphite as the block material for the freeze valve allows heat to diffuse into and out of the valve much more rapidly than if it were made entirely of a refractory ceramic material.

In in the preferred embodiment, as shown in FIG. 2, a flexible ring seal (15), well known in the art, can be used to create a detachable sealed connection between the drain valve and the disposal container.

The fifth feature of the AVS-2 Melter Module is a means for filling the AVS-2 Melter Module with vitrified waste. This means comprises the shape and composition of, heating and cooling capability for, and functionality of the AVS-2 Melter Module that is similar to the AVS-1 module.

The non-similarity in shape involves variations to accommodate fractional sizes of any standard disposal container so that it is possible to fit more than one AVS-2 Melter Module into whatever is chosen as a standard disposal container. Such non-similarity further involves the detachable means to regulate the flow of melted waste out of the module, which is unique to the AVS-2 Melter Module.

The non-similarity in composition of the AVS-2 Melter Module involves the greater flexibility for enhanced graphite corrosion protection over that for the AVS-1 module and the addition of a detachable means to regulate the flow of melted waste out of the bottom of the AVS-2 Melter Module.

The corrosion protection in the AVS-2 Melter Module can be made to any appropriate thickness, which enhances life and minimizes cost. Such corrosion protection is well known in the art. An average thickness for most embodiments employing alumina as corrosion protection is about 2 cm. Corrosion protection for the AVS-2 Melter Module can made be a more effective using other refractory, e.g. zirconium oxide or hafnium oxide, without significantly affecting cost. Assuming a 2-centimeter thick liner (which can be 2 or more thinner concentric liners), a one-month operating lifetime for the AVS-2 Melter Module would have a corrosion rate of about 10 mils per day without risking module failure. Conventional melters must have substantially lower corrosion rates if they are to last the required period of years. Moreover, a ceramic fiber reinforced refractory liner could be used because of its toughness and effective ductility. Such a liner might be too expensive for the AVS-1 module, but should be affordable for a half-length AVS-2 Melter Module, which would then be able to process a minimum of about 50 AVS-2 Disposal Modules.

What is claimed is:

1. A re-usable and disposable melter module for the vitrification of waste comprising,
   (a) a detachable means for adding waste;
   (b) a detachable means for removing off-gases;
   (c) a means for adding heat to melt the waste;
   (d) a detachable means for regulating the flow of melted waste out of the module;
   (e) a means for filling the module with vitrified waste; and,
   (f) a means for disposing of said filled module, wherein the filled module has the same outward appearance as a disposal container.

2. The module of claim 1 wherein the means for regulating the flow of melted waste out of the module is a freeze-drain shut-off valve comprising an outer stainless steel body, a lining of insulation, a lining of graphite, a chamber in the top section for receiving molten waste, a graphite block in the middle section of the valve coated with corrosion protection and having one or more corrosion protected flow channels that permit discharge of molten waste into the bottom section of the valve and thence out of the valve and means for independently controlling the temperature in the top, middle and bottom sections of the valve.

3. A method of using the module of claim 1 comprising,
   (a) a step for connecting the means for adding waste and the means for removing off-gases to a waste source and an off-gas processing system;
   (b) a step for connecting a disposal container to the module;
   (c) a step for adding waste and heat to the module;
   (d) a step for filling a disposal container;
   (e) a step for removing the disposal container;
   (f) a step for repeating steps (a) through (e) until a predetermined number of disposal containers have been filled;
   (g) a step for filling the AVS-2 Melter Module with vitrified waste;
   (h) a step for disconnecting the filled AVS-2 Melter Module; and,
   (i) a step for repeating steps (a) through (h) until all the waste is processed.

* * * * *